United States Patent [19]

Rahman

[11] Patent Number: 5,229,851

[45] Date of Patent: Jul. 20, 1993

[54] OPTICAL FIBER CABLE WITH LARGE NUMBER OF RIBBON UNITS CONTAINING OPTICAL FIBERS AND ENCLOSED IN TUBES

[75] Inventor: Mujib Rahman, Columbia, S.C.

[73] Assignee: Pirelli Cable Corporation, Lexington, S.C.

[21] Appl. No.: 862,597

[22] Filed: Apr. 2, 1992

[51] Int. Cl.⁵ .................................................. G02B 6/44
[52] U.S. Cl. ........................................ 385/114; 385/112; 385/113
[58] Field of Search ............................... 385/109–114

[56] References Cited

U.S. PATENT DOCUMENTS

| | | | |
|---|---|---|---|
| 3,798,099 | 3/1974 | Marcatili | 385/114 |
| 3,920,432 | 11/1975 | Smith | 65/4 |
| 3,984,172 | 10/1975 | Miller | 385/114 |
| 4,070,093 | 1/1978 | Schwartz | 385/114 |
| 4,129,468 | 12/1978 | Knab | 385/114 |
| 4,147,407 | 4/1979 | Eichenbaum et al. | 385/114 |
| 4,241,979 | 12/1980 | Gagen et al. | 385/114 |
| 4,557,560 | 12/1985 | Bohannon, Jr. et al. | 385/114 |
| 4,695,128 | 9/1987 | Zimmerman et al. | 385/113 |
| 4,730,894 | 3/1988 | Arroyo | 385/114 |
| 4,744,631 | 5/1988 | Eichenbaum et al. | 385/114 |
| 4,900,126 | 2/1990 | Jackson et al. | 385/114 |
| 4,980,007 | 12/1990 | Ferguson | 385/114 |
| 5,067,830 | 11/1991 | McAlpine et al. | 385/114 |
| 5,076,881 | 12/1991 | Ferguson | 385/114 |

Primary Examiner—John D. Lee
Assistant Examiner—John Ngo
Attorney, Agent, or Firm—Brooks Haidt Haffner & Delahunty

[57] ABSTRACT

A plurality of optical fiber ribbons, each containing a plurality of optical fibers, are loosely enclosed in a substantially fluid impervious tube of plastic material. A plurality of such ribbon enclosing tubes are wound in S or Z fashion around a central structural member which can be covered with a plastic material. The so-wound tubes are encircled by threads or tape to hold them in place, and a covering of helically wound yarns is applied around the tubes to provide strength. A plastic sheath is applied over the yarns, and if desired the sheath is covered with other layers. Any otherwise empty spaces within the tubes and between the sheath and the tubes is filled with a water blocking material which permits the ribbons to move with respect to the enclosing tubes and which permits the tubes to move with respect to the sheath and the central member.

11 Claims, 2 Drawing Sheets

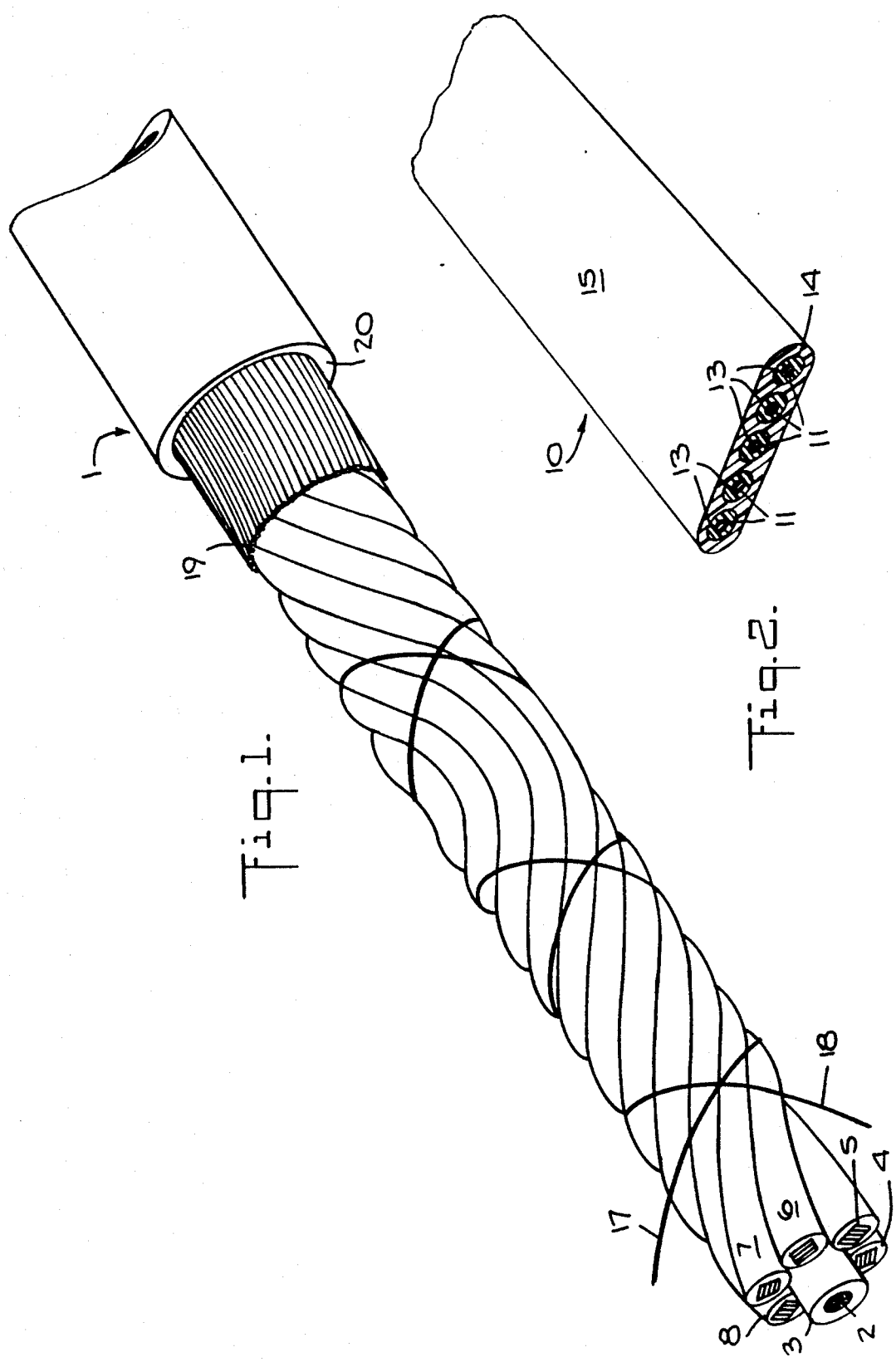

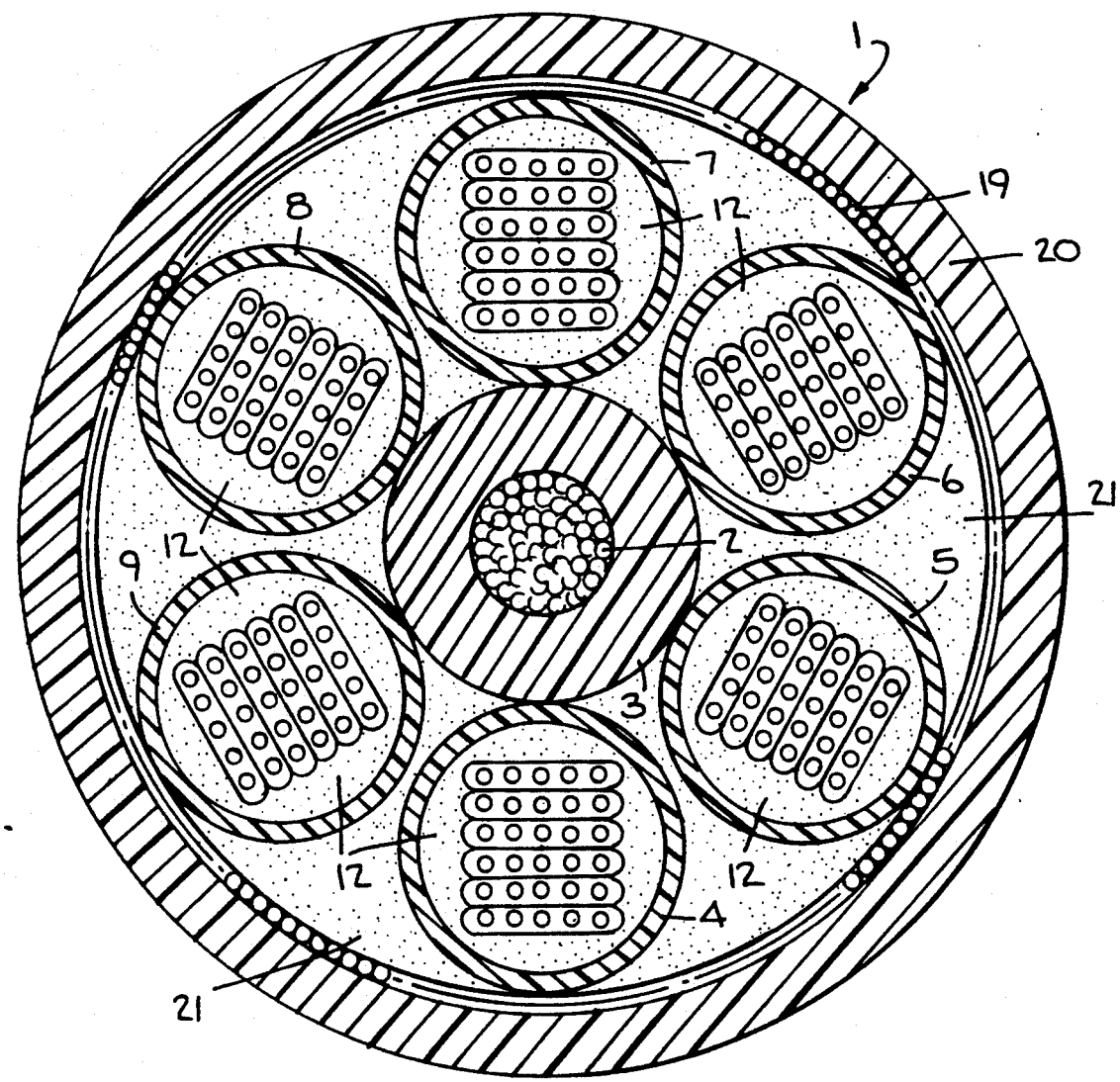

OPTICAL FIBER CABLE WITH LARGE NUMBER OF RIBBON UNITS CONTAINING OPTICAL FIBERS AND ENCLOSED IN TUBES

BACKGROUND OF THE INVENTION

This invention relates to optical fiber communication cables including a large number of optical fibers.

Optical fiber cables are used for transmitting information between various devices including telephone exchanges, computers, etc. Although each fiber can transmit relatively large amounts of information by way of light signals guided by the fibers, there is a demand for cables with a large number of fibers, e.g. 145 to 1250 or larger. Presently installed, or available, cables have fewer fibers.

The optical fibers are small in diameter, a few microns, and are relatively fragile. Therefore, they must be protected from mechanical stresses encountered during manufacture, installation and operation such as bending and pulling stresses. One known way of protecting optical fibers is to place them loosely in tubes with the fibers longer than the tubes and to associate with such tube a tensile member, e.g. a stranded metal wire, a high strength plastic or carbon, glass or graphite fibers, which absorbs the tensile stresses. The tubes with the tensile member are enclosed in a sheath or sheaths. See, for example, U.S. Pat. Nos. 4,078,853; 4,153,332; and 4,230,395.

With the optical fiber loosely received in the tubes, there are unfilled spaces within the tubes, and the fibers should be protected from moisture and other hydrogen compounds. It is known to fill such tubes with a grease-like material which prevents migration of such moisture and compounds in the tubes but which permits relative movement of the fibers and their enclosing tubes. See, for example, U.S. Pat. Nos. 4,230,395; 4,722,589 and 4,725,121.

When the tubes containing the fibers are of circular cross-section and are encircled by a sheath of circular cross-section, there are spaces between the tubes, and it is desirable to prevent the ingress of moisture into the latter spaces. It is known to fill such latter spaces with a grease-like material similar to, or the same as, the grease-like material used to fill the tubes, but which permits relative movement of the tubes. See, for example, U.S. Pat. No. 4,230,395.

Such tubes containing the optical fibers or the optical fibers themselves are often wound helically around a central supporting structure which can contain the tensile member. In some cases, they are placed on the central supporting structure in what is called an S or Z shaped configuration, or in other words, they are wound around the central supporting structure in a first direction, or hand, for one or several turns and then, the direction of winding is reversed for one or several turns. Such reversal is continued periodically. See, for example, U.S. Pat. Nos. 4,697,875; 4,722,589 and 4,725,121.

Ribbons of plastic material encasing several optical fibers in side-by-side relation, also known as "parallel" fibers, are known in the art and have several advantages including protection of the optical fibers individually, ease of handling and ease of identification of individual fibers. See, for example, U.S. Pat. Nos. 3,883,218; 3,937,559; 4,078,853 and 4,185,887. Such ribbons have been wound helically around a central supporting member and have been inserted loosely in tubes wound around a centrally disposed one of such tubes.

However, it has been assumed that by encasing the optical fibers in a ribbon of plastic, the fibers have adequate moisture protection without the need for a moisture migration preventing, or hydrogen absorbing, material.

Because of their advantages, such ribbons of plastic material encasing a plurality of optical fibers are especially suitable for interconnecting information transmitting and receiving terminals. Typically, cables containing up to 144 optical fibers have been used, and to meet further traffic demand, separate parallel cables have been installed. A demand has arisen for an optical fiber cable containing more than 144 optical fibers, i.e. in excess of 144 optical fibers and up to at least 1250 optical fibers. Furthermore, it is not sufficient that connections be made only at the ends of such a cable which, at this stage of development, can have a length of tens of kilometers without interruption. Instead, particularly when the cable has 145 or more optical fibers, connections to fibers of the cable intermediate its length are needed. It is highly desirable to be able to connect a number of fibers in the cable to a station intermediate the ends of the cable without disturbing others of the fibers in the cable. If the optical fibers are helically wound around the core or are in tubes helically wound around the core, it becomes difficult to connect to the optical fibers at an intermediate point of the cable because there is insufficient slack in the optical fibers or tubes, and the slack which is available is needed to prevent damage to the fibers during handling, bending and temperature changes, optical fibers being notoriously fragile. Furthermore, access to inner fibers is hampered by outer fibers.

It has been proposed that cables with helically wound fibers be interconnected by an adapter with an S or Z winding of the optical fibers. See application Ser. No. 671,537, filed Mar. 19, 1991 and entitled "Joint For Optical Cables And Method Of Making Such Joint". However, such proposal requires that the cable be severed transversely to its axis, a special adapter be provided and that a number of optical fibers, equal to the number of fibers in each cable be included in the adapter. Then, a number of fiber interconnections which is double the number of fibers to be interconnected is made. Such proposed interconnection is impractical with a large number of optical fibers.

Also, when a cable having a plurality of optical fiber ribbon units does not have a moisture or hydrogen absorbing compound therein, which the prior art has considered to be unnecessary, the optical fibers are subject to moisture, and consequent damage, when the cable is opened for a branch connection to one or more of the ribbon units.

SUMMARY OF THE INVENTION

In accordance with preferred embodiments of the invention, a plurality of optical fiber ribbons, or ribbon units, each with a plurality of optical fibers, are enclosed in a tube of substantially fluid impervious, e.g. water and/or gas-tight, plastic material which is wound in S or Z fashion, hereinafter sometimes identified as an "alternating hand helix", around a central structural member which, may be covered with a thermoset or thermoplastic material or other material. Each ribbon unit is loosely received in the tube and preferably has a rectilinear length greater than the axial rectilinear length of the tube or cable. Preferably, there are a plurality of such tubes so-wound around the central structural member.

The so-wound tubes, preferably, have a non-conductive thread or tape, preferably, a pair of opposite hand threads of plastic or other material, wound therearound to hold them in place, then, a covering, such as helically wound yarns of polymers, glass or other materials, is applied over the tubes to provide strength, and then a covering of a plastic material, such as polyethylene, is applied thereover to form a sheath or jacket. If desired, such sheath or jacket may be covered with protective other layers of insulating material and/or metal armoring in the form of metal tapes or wires around the covering of plastic material or the other layers of insulating material.

In the preferred embodiment, not only any otherwise empty spaces within the tubes but also any otherwise empty spaces within the sheath or jacket are filled with a water blocking or hydrogen absorbing compound of the type set forth in said U.S. Pat. Nos. 4,230,395; 4,697,875; 4,722,589; 4,725,121 or 4,230,395 or in U.S. Pat. No. 4,718,747.

With such construction, a large number of optical fibers can be included in a single composite cable and connections can be made with the optical fibers in one or more ribbon units at almost any point along the length of the already installed composite cable without interrupting other ribbon units or tubes in the composite cable. The water blocking or hydrogen absorbing compound at each side of the openings required for the connections not only prevents moisture migration along the length of the composite cable from the openings but also shields the other ribbon units from atmospheric moisture at the openings. Furthermore, the S or Z configuration of the tubes permits connections to the ribbon units without reducing the length of the already installed ribbon units, and hence, the optical fibers, at each side of the connecting point.

If desired, the optical fibers within a ribbon cable can be undulated as described in U.S. Pat. No. 3,937,559, and one or more of the ribbon cables can include metal wires as described in U.S. Pat. No. 4,185,887.

Also, the ribbon units can be inserted in the tubes with or without a twist, but preferably, the ribbon units have an S or Z twist for the same reasons that the tubes have an S or Z twist and to prevent stress on the ribbon units when the tubes are applied around the central member.

BRIEF DESCRIPTION OF THE DRAWINGS

FIG. 1 is a diagrammatic perspective view of a preferred embodiment of the optical fiber cable of the invention;

FIG. 2 is a perspective view of one form of ribbon unit which can be used with the optical fiber cable of the invention;

FIG. 3 is a perspective view of another form of ribbon unit and which can be used with the optical fiber cable of the invention; and FIG. 4 is an enlarged cross-sectional view of the cable shown in FIG. 1.

DETAILED DESCRIPTION OF PREFERRED EMBODIMENT

The invention will be described in connection with a cable having six tubes around a central structural member, each tube enclosing six ribbon units and each ribbon unit containing five optical fibers for a total of one-hundred and eighty optical fibers. There may, of course, be a greater or lesser number of tubes, a greater or lesser number of ribbon units in a tube and/or a greater or lesser number of optical fibers in a ribbon unit.

As illustrated in FIGS. 1 and 4, the preferred embodiment of the optical fiber cable 1 of the invention includes a central structural member 2 intended to withstand and resist any tensile or compressive forces applied axially to the cable 1 and to protect other elements of the cable 1 with respect to such forces. As compared to the material of the tubes enclosing the ribbon units the central structural member is substantially inextensible and incompressible by tensile and compression forces normally applied to the cable 1. The member 2 can, for example, be stranded steel wires or graphite, glass or polymer fibers, which can be reinforced or bonded or unbonded and either parallel to the cable axis or stranded.

The structural member 2, preferably, is encircled by a covering 3 which can be a plastic, either thermoplastic or thermosetting, or another material. If desired, the covering 3 can be a cushioning material, such as a foamed plastic.

If the resistance of the cable 1 with respect to axial tension is provided by means other than the central structural member 2, the central structural member 2 can be omitted while retaining the covering 3 in tubular form, and one or several ribbon units, hereinafter described, can replace the member 2. In the latter case, the ribbon units would be loosely received in the covering 3 and have a rectilinear length greater than the rectilinear length of the covering 3, and any otherwise empty spaces within the covering 3 would be filled with a moisture blocking compound of the type described hereinbefore.

There are a plurality of tubes 4 through 9 around the covering 3. Each tube 4 through 9 is flexible and substantially fluid impervious and can, for example, be made of a plastic material. The tubes 4 through 9 engage the outer surface of the covering 3 and can contact each other or have a small space therebetween as shown.

Each tube 4 through 9 encircles a plurality of ribbon units 10 which, as shown, are identical, but the units 10 may differ from each other, e.g. in the number of optical fibers 11 included therein, marking, coloring, etc. As shown, each tube 4 through 9 includes the same number of ribbon units 10, i.e. a group of six, but the number of ribbon units 10 in one or more of the tubes 4 through 9 may differ from the number of ribbon units 10 in another or the remainder of the tubes 4 through 9.

The internal diameter of the tubes 4 through 9 are greater than the size of the groups, e.g. at least 1% to 10% greater than the maximum dimension of the group, so that the ribbon units cannot only slide axially of the tubes 4 through 9 but also move transversely of the axis of the tubes 4 through 9. Thus, the ribbon units 10 are loosely received in the tubes 4 through 9.

Preferably, the ribbon units 10 are not bound together in a group and the ribbon units 10 in a group are not bonded to each other so that they can move relative to each other. Although the group of ribbon units 10 can be helically twisted around the axis of the group or be without a twist, preferably, the group is twisted first in one direction for one or more turns and then, in the opposite direction for one or more turns to aid in reducing or eliminating stress on the ribbon units 10 when the tubes 4 through 9 are applied as described hereinafter.

Preferably, the ribbon units 10 have a rectilinear length greater than the rectilinear length of the axis of the tubes 4 through 9 in which they are received so that stress applied to the tubes 4 through 9 is not applied to the ribbon units 10 if the tubes 4 through 9 are not stretched beyond normal limits.

Any otherwise empty spaces within the tubes are filled with a water blocking, and/or a hydrogen absorbing, compound 12 of the type described hereinbefore. The compound 12 can be in the form of a known type of grease and can be thixotropic so that movement of the ribbon units 10 with respect to each other and to the tubes 4 through 9 is permitted.

An important feature of the invention is that the tubes 4 through 9 are wound around the covering 3, and hence, the central member 2, in S or Z, or alternate hand helix, manner so as to permit easy branch connection to one or more ribbon units 10 at various points intermediate the ends of the cable 1 without disturbing other ribbon units 10, particularly, ribbon units 10 in another of the tubes 4 through 9. Such winding of the tubes 4 through 9 is illustrated in FIG. 1. Thus, the tubes 4 through 9 are helically wound in a first direction, or hand, around the covering 3 for one or several turns and then, are helically wound in the opposite direction, or hand, around the covering 3 for one or several turns, such alternate direction of winding being continued periodically or aperiodically.

FIG. 2 illustrates one known type of ribbon unit 10 containing five optical fibers 11. The fibers 11, with any cladding or coating 13 therearound are encased in a plastic material 14. The ribbon unit 10 has a pair of major surfaces 15 and 16 and a thickness which is small relative to the width of the major surfaces 15 and 16, the width dimension of the major surfaces being perpendicular to the length of the ribbon unit 10 and the thickness dimension of the ribbon unit being perpendicular to the major surfaces 15 and 16. The ribbon unit 10 is flexible in the direction transverse to the major surfaces and can be twisted around its longitudinal axis.

Another type of ribbon unit 10a is illustrated in FIG. 3. In the ribbon unit 10a, which has seven optical fibers 11, but which may be any other number of fibers 11, with a cladding or coating 13, the fibers 11 are not encased in a plastic. Instead, the fibers 11 are held together, or edge bonded, by a layer of plastic applied thereon. Such plastic can, for example, be an acrylic resin.

In contrast to the situation when the tubes 4 through 9 are wound around the covering 3 in a continuous helix of a single hand, the tubes 4 through 9 will tend to loosen or become disengaged from the cover 3 when an alternate hand helix is used. Therefore, to assist in further processing, the tubes 4 through 9 are held against the covering 3 by a non-conductive tape or thread. As illustrated in FIG. 1, the tubes 4 through 9 are held in place by a pair of helically and oppositely wound threads or yarns 17 and 18. Although only one yarn 17 or 18, or one group of yarns 17 or 18 can be used, two oppositely wound yarns or group of yarns are preferred. Such yarns 17 and 18 may be made of polymers or glass or other materials.

If the central member 2 is not a strength member, or preferably even if there is a strength member 2, the cable 1 of the invention includes a plurality of strings or yarns 19, such as polymer or glass strings or yarns or of other materials which can be reinforced, bonded or unbonded, and which are helically wound around the tubes 4 through 9 and the yarns 17 and 18, to provide a strength member which protects the tubes 4 through 9 and the optical fibers 11 from tensile forces applied axially of the cable 1.

The strength member 19 is encircled by a sheath 20 of a plastic or elastic material, such as medium density polyethylene.

If desired, the sheath 20 can be encircled by other layers, such as other layers of plastic, metal armoring in the form of metal tapes or wires and/or other materials.

As is well-known in the art, the performance of optical fibers, e.g. attenuation, is adversely affected by hydrogen containing compounds, such as water, and every effort should be made to prevent exposure of the optical fibers to moisture. For this purpose, the plastic material of the ribbon units 10 is selected to be substantially fluid impervious. Therefore, if the ribbon units 10 are encircled by tubes 4 through 9, it has not been considered essential to make the tubes 4 through 9 of substantially fluid impervious material. Furthermore, if the tubes 4 through 9 are made of such a fluid impervious material with such ribbon units therein, it has not been considered to be necessary to include a water blocking compound, with its attendant cost and manufacturing complications, within the tubes 4 through 9. Also, if the ribbon material 14 encasing the optical fibers is substantially fluid impervious, and the tubes 4 through 9 are substantially fluid impervious and are filled with a water blocking compound, it would appear to be superfluous to include a water blocking compound in any otherwise empty spaces within the sheath 20 and the covering 3. However, such assumption in the prior art also assumes that the cable includes a relatively small number of optical fibers and that connections to the cable are made only at the end thereof where suitable precautions can be taken to prevent the entrance of moisture into the cable. Furthermore, plastic materials are not 100% fluid impervious.

As pointed out hereinbefore, with a large number of optical fibers in the cable 1, it is often necessary to open the cable 1 at one or more points along the length of the cable 1 to "tap", or make a branch connection to, one or more, but less than all, the optical fibers 11. To do this, it is necessary to remove a portion of the sheath 20 and the strength layer 19 but the tube of the tubes 4 through 9, which can have an identifying marking or color, can be identified after the portions of the sheath 20 and layer 19 are removed. The desired tube of the tubes 4 through 9 can then be opened, and the desired ribbon unit 10, which can also have an identifying marking or color can be selected. Because the tube 4 through 9 have an alternating hand configuration, it is unnecessary to sever the cable or to carry out major reconfiguration, and there is sufficient excess of tube length to make the connection easily and without losing the desired slack in the ribbon units within the tube 4 through 9 which is opened. Thus, connections can be made thereto without interrupting other tubes or ribbon units.

On the other hand, it will be observed that when the portion of the sheath 20 is removed, the spaces between the sheath 20 and the covering 3, and hence, adjacent to the tubes 4 through 9, are exposed to the atmosphere which means that moisture can enter into such spaces and migrate lengthwise of the cable 1. Also, if the tube which is opened does not have a water blocking material therein, moisture can migrate lengthwise of the tube. Since the branch connections may not be performed under conditions where such moisture can be avoided, it is desirable to include a water blocking and/or hydrogen absorbing material 21 in all otherwise empty spaces between the sheath 20 and the covering 3.

Also, if the central member 2 is stranded, or otherwise formed to leave spaces within the covering 3, such space can be filled with a water blocking and/or hydrogen absorbing compound.

Although preferred embodiments of the present invention have been described and illustrated, it will be apparent to those skilled in the art that various modifications may be made without departing from the principles of the invention.

I claim:

1. An optical fiber cable comprising:
   a central member;
   at least one substantially fluid impervious tube wound around said central member in an alternating hand helix;
   at least one ribbon unit comprising a plurality of optical fibers held together in side-by-side relation in a non-conductive material, said ribbon unit being loosely received in said tube, said ribbon unit having a pair of major surfaces, a thickness between said surfaces which is small relative to the width of said surfaces and having a length greater than the axial length of said tube;
   a sheath of plastic material encircling said tube which is wound around said central member; and
   a water blocking material in any otherwise empty spaces in said tube and between said sheath and said tube, said water blocking material permitting said ribbon unit to move with respect to said tube and permitting said tube to move with respect to said sheath and to said central structural member.

2. An optical fiber cable as set forth in claim 1 wherein said central member is a central structural member which is substantially inextensible and incompressible as compared to said tube for resisting tensile and compressive forces applied axially of said cable and wherein said cable comprises a plurality of the substantially fluid impervious tubes in side-by-side relation and wound around said central structural member in an alternating hand helix and a plurality of said ribbon units in each of said plurality of tubes.

3. An optical fiber cable as set forth in claim 2 wherein said optical fibers are encased in a plastic material, said water blocking material is a grease and contains a hydrogen absorbing compound.

4. An optical fiber cable as set forth in claim 3 wherein said grease is thixotropic.

5. An optical fiber cable as set forth in claim 2 wherein the plurality of ribbon units in a tube are superimposed with a major surface of one ribbon unit adjacent a major surface of another ribbon unit.

6. An optical fiber cable as set forth in claim 5 wherein a plurality of superimposed ribbon units in a tube form a group of ribbon units having a common axis in cross section and said group of ribbon units is twisted around said axis in an alternating hand helix.

7. An optical fiber cable as set forth in claim 2 further comprising at least one elongate element of non-conductive material wound around said plurality of tubes for holding said tubes against said structural member.

8. An optical fiber cable as set forth in claim 7 wherein said elongate element is a thread.

9. An optical fiber cable as set forth in claim 7 wherein said elongate element is a tape.

10. An optical fiber cable as set forth in claim 7 wherein there are two elongate elements, one of said elements being helically wound around said tubes in one hand and the other of said elements being helically wound around said tubes in an opposite hand.

11. An optical fiber cable as set forth in claim 2 further comprising a strength layer of fibers encircling said tubes and intermediate said tubes and said sheath.

* * * * *